US011978872B2

(12) United States Patent
Koga et al.

(10) Patent No.: US 11,978,872 B2
(45) Date of Patent: May 7, 2024

(54) TEMPERATURE MEASUREMENT DEVICE, TEMPERATURE MEASUREMENT METHOD, AND BATTERY SYSTEM

(71) Applicant: TOYOTA JIDOSHA KABUSHIKI KAISHA, Toyota (JP)

(72) Inventors: Tsuyoshi Koga, Gotemba (JP); Masaya Murase, Nagoya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 17/713,824

(22) Filed: Apr. 5, 2022

(65) Prior Publication Data

US 2022/0407134 A1  Dec. 22, 2022

(30) Foreign Application Priority Data

Jun. 21, 2021  (JP) ................. 2021-102699

(51) Int. Cl.
*H01M 10/48* (2006.01)
*H01M 10/613* (2014.01)
*H01M 10/647* (2014.01)
*H01M 10/65* (2014.01)
*H01M 50/414* (2021.01)

(52) U.S. Cl.
CPC ....... *H01M 10/613* (2015.04); *H01M 10/486* (2013.01); *H01M 10/647* (2015.04); *H01M 10/65* (2015.04); *H01M 50/414* (2021.01)

(58) Field of Classification Search
CPC .... H01M 10/13; H01M 10/647; H01M 10/65; H01M 10/486; H01M 50/414
See application file for complete search history.

(56) References Cited

U.S. PATENT DOCUMENTS 5,772,325 A     6/1998  Hopson et al.
2020/0033196 A1*  1/2020  Tanaka ................ H01M 10/486

FOREIGN PATENT DOCUMENTS

| JP | 3018960 U | 12/1995 |
| JP | H09-145727 A | 6/1997 |
| JP | 2008-512840 A | 4/2008 |
| JP | 2021-068668 A | 4/2021 |
| WO | 2006/049393 A1 | 5/2006 |

* cited by examiner

*Primary Examiner* — Christopher P Domone
*Assistant Examiner* — Kimberly Wyluda
(74) *Attorney, Agent, or Firm* — Dinsmore & Shohl LLP (57) ABSTRACT

A temperature measurement device includes a heat transfer member including a temperature measuring portion having a flat shape and extending laterally and a heat transfer portion that extends continuously from the temperature measuring portion and transfers heat of the temperature measuring portion, a clamping member that generates a clamping force with the temperature measuring portion, a temperature sensor that is fixed while being in contact with the heat transfer portion, and a resin member that covers and holds the heat transfer portion and the temperature sensor.

8 Claims, 6 Drawing Sheets

TEMPERATURE MEASUREMENT DEVICE, TEMPERATURE MEASUREMENT METHOD, AND BATTERY SYSTEM

CROSS-REFERENCE TO RELATED APPLICATION

This application claims priority to Japanese Patent Application No. 2021-102699 filed on Jun. 21, 2021, incorporated herein by reference in its entirety.

BACKGROUND

1. Technical Field

The present disclosure relates to a temperature measurement device and a temperature measurement method for measuring a temperature of a laminate battery, and a battery system having a function of measuring a temperature of a laminate battery cell for a battery assembly.

2. Description of Related Art

Japanese Unexamined Patent Application Publication No. 2008-512840 (JP 2008-512840 A) discloses a measuring member for simultaneously measuring a voltage and a temperature of a unit cell in a high-power, large-capacity battery pack including a plurality of unit cells that are electrically connected to each other. The measuring member includes a temperature measuring element attached to the surface of the unit cell, and a printed circuit board. The printed circuit board includes, at an upper end thereof, a projection provided so as to be connected to an electrode lead wire connecting member for connecting an electrode lead wire of the unit cell, and at a lower portion thereof, a connecting portion for attaching the temperature measuring element to the printed circuit board. Further, the printed circuit board includes a circuit through which a current for measuring a voltage of the unit cell and a temperature measuring current of the temperature measuring element flow.

SUMMARY

In order to control charging and discharging of the battery and to improve the efficiency of charging and discharging, it is required to measure the temperature of the electrode portion of the battery. In a laminate battery cell that is one of the general forms as a battery cell constituting a battery assembly, the electrode portion constitutes the body surface of the battery cell. However, in the battery assembly in which battery cells are densely arranged, attaching the temperature sensor to the electrode portion of the laminate battery cell may make the constraining surface pressure of the electrode portion uneven to cause gas accumulation. Furthermore, for example, in the lithium ion battery, lithium is deposited at the boundary with respect to the electrolyte solution of the battery, so performance and life of the battery decreases.

The present disclosure has been made in view of the above problems, and an object thereof is to provide a temperature measurement device and a temperature measurement method capable of measuring a temperature of a laminate battery without the need to directly attach the device to an electrode portion, and a battery system having a function capable of measuring a temperature of a laminate battery cell for a battery assembly without the need to directly attach the device to an electrode portion.

A first aspect of the present disclosure relates to a temperature measurement device. The temperature measurement device includes: a heat transfer member including a temperature measuring portion having a flat shape and extending laterally and a heat transfer portion that extends continuously from the temperature measuring portion and transfers heat of the temperature measuring portion; a clamping member that generates a clamping force with the temperature measuring portion; a temperature sensor that is fixed while being in contact with the heat transfer portion; and a resin member that covers and holds the heat transfer portion and the temperature sensor.

In the first aspect, the clamping member may use a portion serving as a leaf spring to generate the clamping force with the temperature measuring portion.

In the above aspect, the resin member may include a handle portion.

In the above aspect, a heat insulating member disposed between the heat transfer portion and the resin member may be further provided.

In the above aspect, insulation coating may be applied to the temperature measuring portion and the clamping member.

A second aspect of the present disclosure relates to a temperature measurement method for measuring a temperature of a laminate battery.

The temperature measurement method includes: bringing a temperature measuring portion of a heat transfer material into contact with a sealing portion of a laminate film that is located near a tab terminal of the battery, the heat transfer material including the temperature measuring portion having a flat shape and extending laterally and a heat transfer portion that extends continuously from the temperature measuring portion and transfers heat of the temperature measuring portion; clamping the sealing portion with a clamping material and the temperature measuring portion; and measuring a temperature with a temperature sensor that is in contact with the heat transfer portion.

In the second aspect, based on a correlation between a temperature of the sealing portion and a temperature of an electrode portion of the battery, the temperature of the electrode portion may be estimated from the temperature measured by the temperature sensor.

A third aspect of the present disclosure relates to a battery system.

The battery system includes: a battery assembly composed of a laminate battery cell; and a temperature measurement device for measuring a temperature of the battery cell. The temperature measurement device includes a heat transfer member including a temperature measuring portion having a flat shape and extending laterally and a heat transfer portion that extends continuously from the temperature measuring portion and transfers heat of the temperature measuring portion, a clamping member that generates a clamping force with the temperature measuring portion, a temperature sensor that is fixed while being in contact with the heat transfer portion, and a resin member that covers and holds the heat transfer portion and the temperature sensor. In the temperature sensor, the temperature measuring portion is in contact with a sealing portion of a laminate film that is located near a tab terminal of the battery, and the temperature measuring portion is attached with the sealing portion being clamped by the clamping member and the temperature measuring portion.

In the third aspect, the clamping member may use a portion serving as a leaf spring to generate the clamping force with the temperature measuring portion.

In the above aspect, insulation coating may be applied to the temperature measuring portion and the clamping member, or a portion near the temperature measuring portion.

With the temperature measurement device, the temperature measurement method, and the battery system according to the present embodiment, it is possible to measure the temperature of the laminate battery without the need to directly attach the device to the electrode portion. In particular, the temperature of the electrode portion can be measured indirectly. Further, it is possible to directly measure the temperature of the sealing portion near the tab terminal having the highest temperature. Accordingly, by performing control of charging and discharging based on the measured temperature, it is possible to improve the reliability regarding the durability of the battery cell as well as improve the efficiency.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Embodiments of the present disclosure will be described below with reference to the drawings. However, in the following embodiments, when a number such as the number of pieces, quantity, amount, range, or the like is mentioned regarding each element, the idea of the present disclosure is not limited by the mentioned number unless otherwise specified or the number is obviously limited in theory. Further, configurations and the like described in the following embodiments are not necessary to the ideas according to the present disclosure, unless otherwise specified or the configurations are obviously limited to those mentioned in the embodiments in theory. In the drawings, the same or corresponding portions are denoted by the same reference signs, and duplicate descriptions thereof are appropriately simplified or omitted.

1. Battery Assembly

Figure 1:
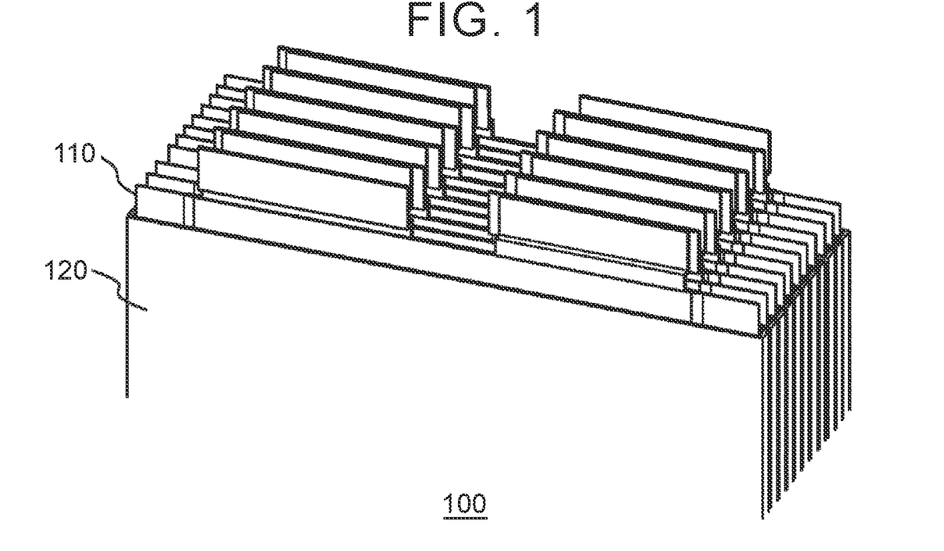
FIG. 1 is a conceptual diagram showing an example of a battery assembly composed of laminate battery cells to which a temperature measurement device according to the present embodiment is applied.

A temperature measurement device according to the present embodiment is applied to a battery assembly composed of laminate battery cells. FIG. 1 is a conceptual diagram showing an example of a battery assembly 100 composed of laminate battery cells 110 to which the temperature measurement device according to the present embodiment is applied.

The battery assembly 100 shown in FIG. 1 is configured such that eleven laminate battery cells 110 are connected in series. Further, each of the battery cells 110 is housed in a heat radiating plate 120. The heat radiating plate 120 is made of, for example, aluminum.

Figure 2:
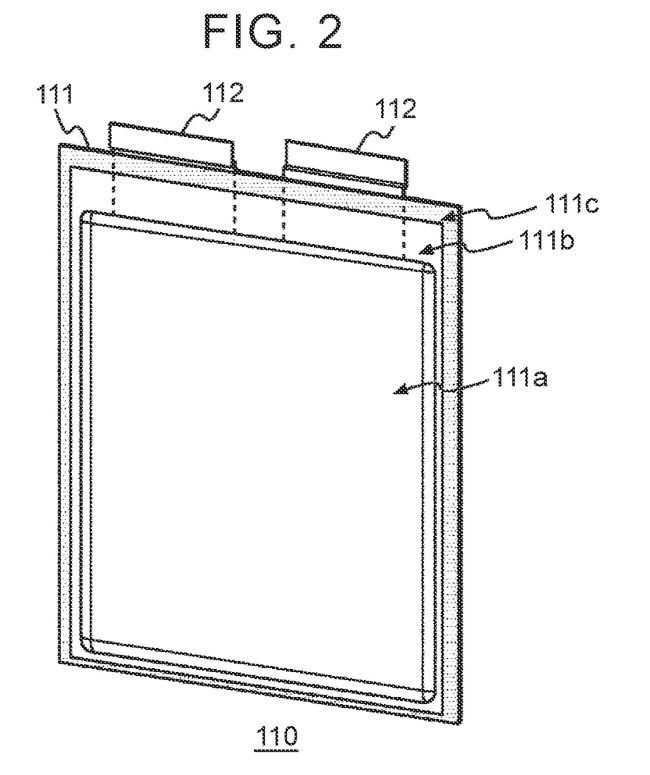
FIG. 2 is a conceptual diagram showing the laminate battery cell constituting the battery assembly shown in FIG. 1.

FIG. 2 is a conceptual diagram showing the laminate battery cell 110 constituting the battery assembly 100 shown in FIG. 1. The battery cell 110 is typically a lithium ion battery. As shown in FIG. 2, in the laminate battery cell 110, electrodes, electrolyte solution, separators, and other materials constituting the battery are wrapped by a laminate film 111. When two tab terminals 112 corresponding to the positive electrode and the negative electrode are electrically connected, charging and discharging of the battery cell 110 is performed.

Here, in FIG. 2, a portion denoted by a reference sign 111a is a portion in which the materials constituting the battery, in particular, the electrodes are wrapped (hereinafter also referred to as "electrode portion 111a"). A portion denoted by a reference sign 111c is a portion in which the laminate film 111 is sealed (hereinafter also referred to as "sealing portion 111c"). A portion denoted by a reference sign 111b is a portion in which sealing is not provided and that serves as an escape path for gas generated due to charging and discharging or age deterioration of the battery cell 110 (hereinafter, also referred to as "gas pocket portion 111b").

In order to control charging and discharging of the battery assembly 100 and to improve the efficiency of charging and discharging, it is required to measure the temperature of the electrode portion 111a. On the other hand, the electrode portion 111a expands due to charging and the like. Accordingly, in the battery assembly 100 in which the battery cells 110 are densely arranged, if a device for measuring the temperature is directly attached to the electrode portion 111a, a surface pressure applied to the electrode portion 111a becomes uneven and gas accumulation may occur. Thereby, for example, in a lithium ion battery, lithium is deposited at the boundary with respect to the electrolyte solution of the battery, performance and life of the battery decreases. Thus, it is not appropriate to directly attach the device to the electrode portion 111a to measure the temperature.

In the laminate battery cell 110, when the temperature of the sealing portion 111c rises with charging and discharging, the strength of the sealing lowers. If the strength of the sealing excessively lowers, the laminate film 111 may be opened by the pressure of the gas generated inside the battery cell 110. Therefore, measurement of the temperature of the sealing portion 111c contributes to improvement of the reliability regarding durability of the battery cell 110. In particular, it is desirable to be able to measure the temperature of the sealing portion 111c near the tab terminal 112 having the highest temperature.

The temperature measurement device and the temperature measurement method according to the present embodiment measure the temperature of the battery cell 110 in the battery assembly 100 composed of the laminate battery cells 110 without the need to directly attach the device to the electrode portion 111*a*. In addition, the temperature of the sealing portion 111*c* near the tab terminal 112 can be measured. Hereinafter, the temperature measurement device according to the present embodiment and the temperature measurement method by the temperature measurement device according to the present embodiment will be described.

2. Temperature Measurement Device

Figure 3A:
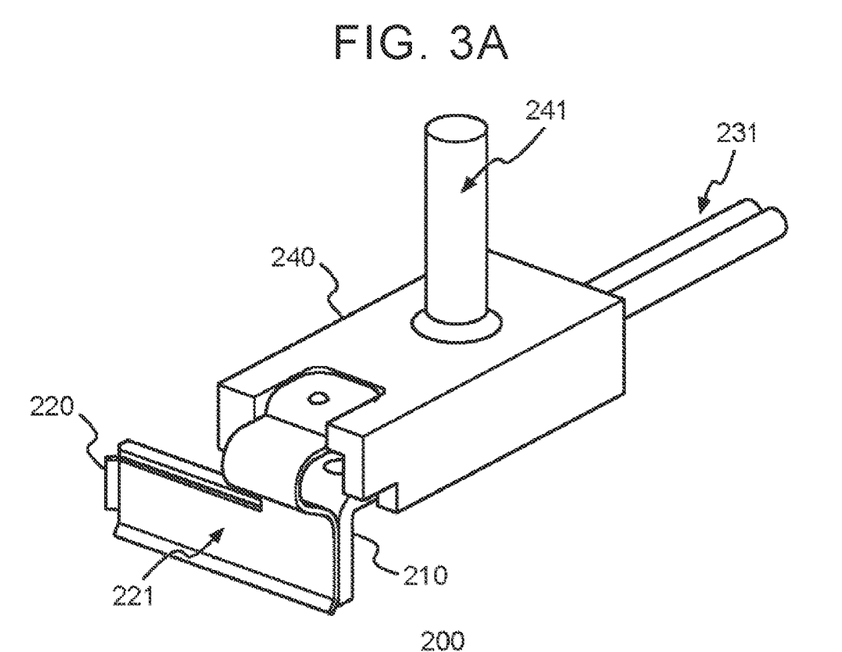
FIG. 3A is a perspective view showing the temperature measurement device according to the present embodiment.
Figure 3B:
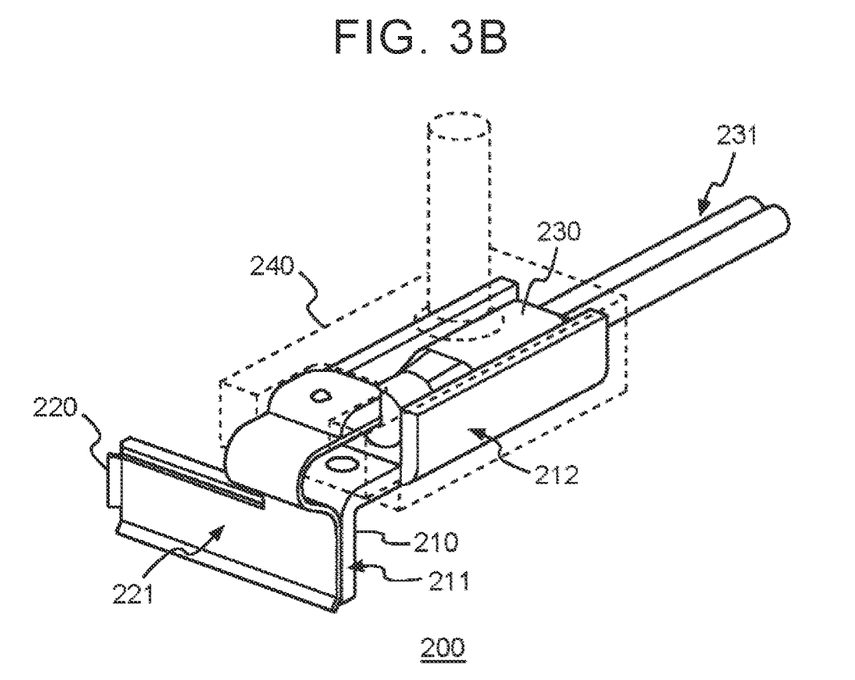
FIG. 3B is a perspective view showing the temperature measurement device according to the present embodiment.

FIGS. 3A and 3B are perspective views showing a temperature measurement device 200 according to the present embodiment. FIG. 3A shows an exterior view of the temperature measurement device 200, and FIG. 3B shows the structure of the interior of the temperature measurement device 200.

The temperature measurement device 200 includes a heat transfer member 210 (heat transfer material), a clamping member 220 (clamping material), a temperature sensor 230, and a resin member 240.

The heat transfer member 210 is typically made of metal having a high thermal conductivity, such as aluminum, copper, silver, or the like. The heat transfer member 210 includes a temperature measuring portion 211 having a flat shape and extending laterally, and a heat transfer portion 212 extending continuously from the temperature measuring portion 211. Here, in the heat transfer member 210, the temperatures of the temperature measuring portion 211 and the heat transfer portion 212 becomes equivalent due to heat transfer.

In FIGS. 3A and 3B, the temperature measuring portion 211 has an L-shape, but the temperature measuring portion 211 may have other shapes. For example, the temperature measuring portion 211 may have an elliptical shape.

The clamping member 220 generates a clamping force with the temperature measuring portion 211 of the heat transfer member 210. That is, an object can be sandwiched between the clamping member 220 and the temperature measuring portion 211. In the temperature measurement device 200 shown in FIGS. 3A and 3B, the clamping member 220 includes a portion 221 serving as a leaf spring (hereinafter, also referred to as "leaf spring portion 221"), and the leaf spring portion 221 generates the clamping force with the temperature measuring portion 211. In this case, the clamping force is caused by elastic deformation of the leaf spring portion 221.

The clamping member 220 is typically made of metal and is formed so as to sufficiently secure the amount of elastic deformation of the leaf spring portion 221.

The temperature sensor 230 is a sensor capable of detecting the temperature of a contact portion, or a sensor capable of detecting a temperature change of the contact portion. The temperature sensor 230 is, for example, a thermistor, a thermocouple or the like. The temperature sensor 230 is fixed while being in contact with the heat transfer portion 212 of the heat transfer member 210. That is, the temperature sensor 230 detects the temperature or the temperature change of the heat transfer portion 212.

The temperature sensor 230 includes a lead wire 231, and outputs, as an electrical signal, detection information of the temperature or the temperature change of the heat transfer portion 212 via the lead wire 231. By acquiring the electrical signal, the temperature of the heat transfer portion 212 can be measured directly or indirectly. However, the detection information of the temperature sensor 230 may be acquired by other methods. For example, the temperature sensor 230 may have a small antenna and may be configured to output the detection information by communication.

The resin member 240 covers and holds the heat transfer portion 212 and the temperature sensor 230. The resin member 240 insulates the temperature measurement device 200 from the surroundings. The resin member 240 is made from resin (including synthetic resin).

The resin member 240 includes a handle portion 241. With the handle portion 241, it is possible to hold the temperature measurement device 200 without touching the components other than the resin member 240. Further, with the handle portion 241, it is easy to apply a force in the vertical direction to the temperature measurement device 200.

The temperature sensor 230 is typically fixed by potting between the heat transfer portion 212 and the resin member 240.

Figure 4:
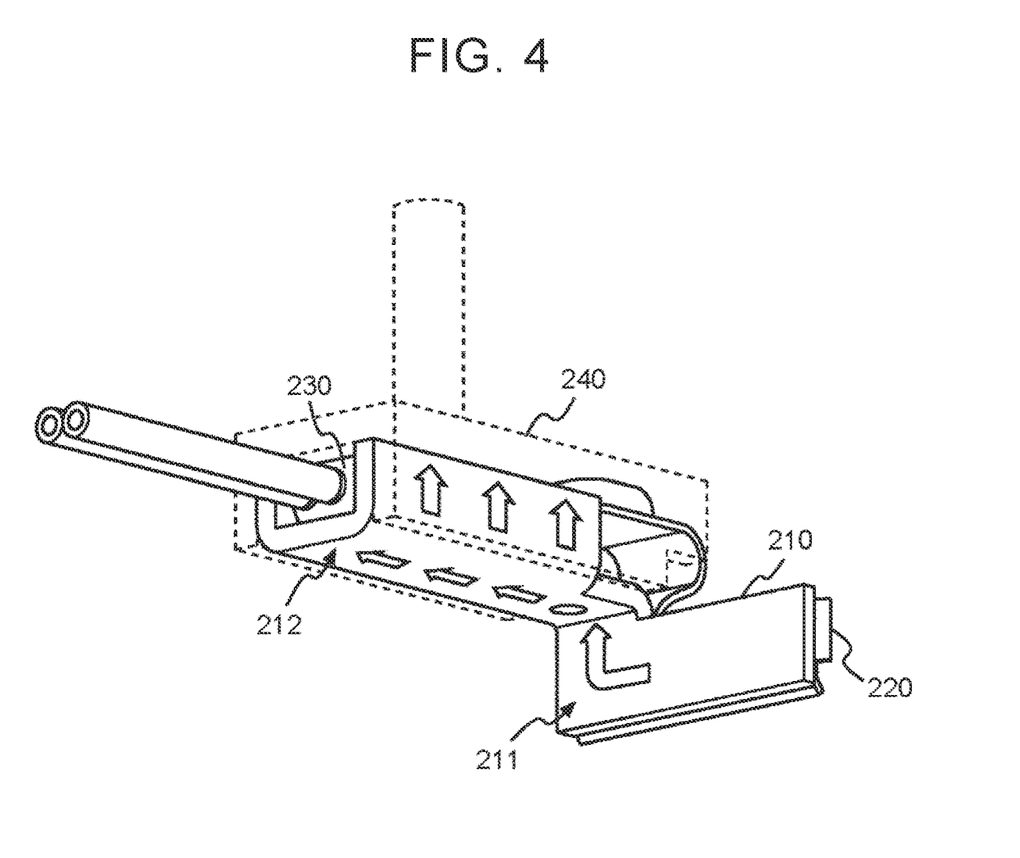
FIG. 4 is a conceptual diagram illustrating measurement of the temperature by the temperature measurement device.

The temperature measurement device 200 can measure the temperature of a portion of the object that is in contact with the temperature measuring portion 211. FIG. 4 is a conceptual diagram illustrating the measurement of the temperature by the temperature measurement device 200. Here, arrows shown in FIG. 4 indicate heat transfer directions.

When the temperature measuring portion 211 is brought into contact with an object, the temperature of the temperature measuring portion 211 becomes equivalent to that of the portion of the object in contact due to heat transfer. Then, as shown in FIG. 4, the heat of the temperature measuring portion 211 is transferred to the heat transfer portion 212. That is, the temperature of the heat transfer portion 212 also becomes equivalent to the portion of the object in contact with the temperature measuring portion 211. By measuring the temperature of the heat transfer portion 212 with the temperature sensor 230, it is possible to measure the temperature of the portion of the object in contact with the temperature measuring portion 211.

3. Temperature Measurement Method

Figure 5A:
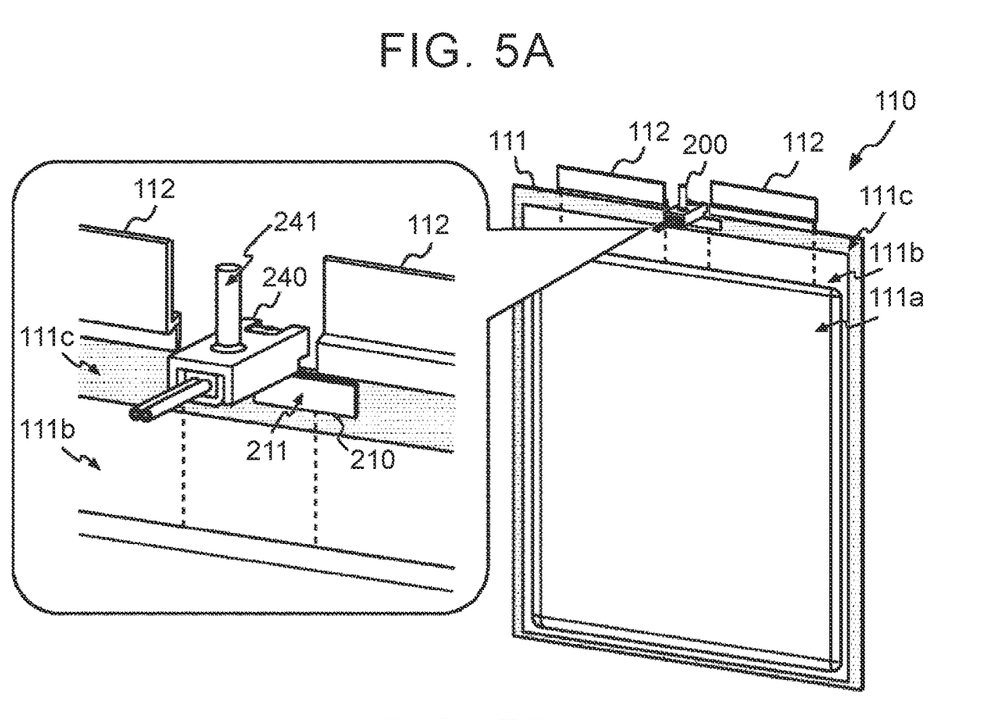
FIG. 5A is a conceptual diagram illustrating a temperature measurement method according to the present embodiment.
Figure 5B:
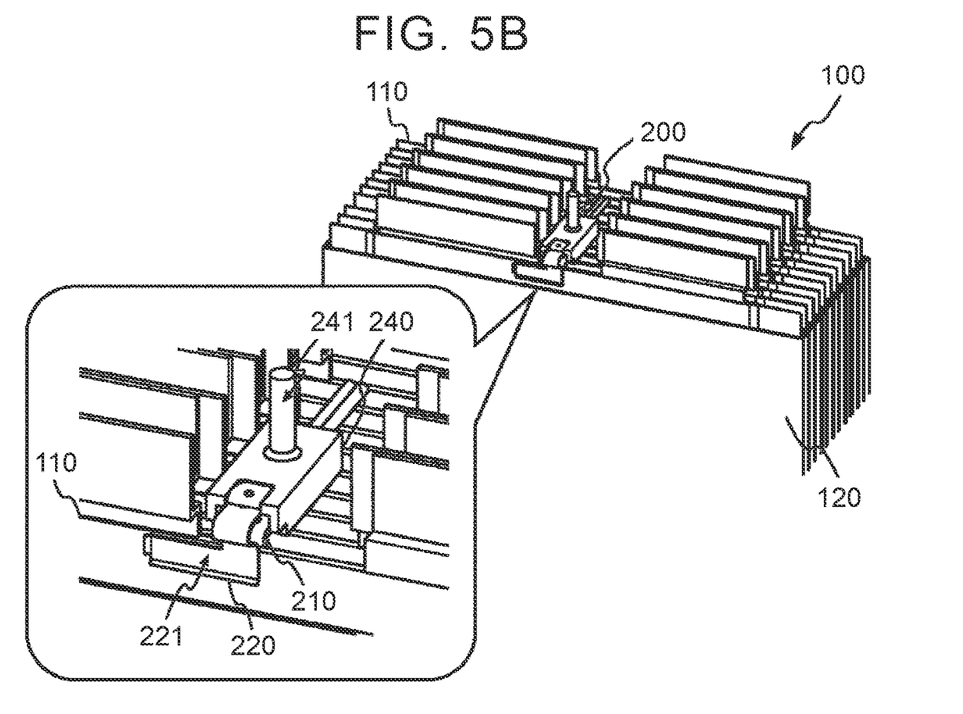
FIG. 5B is a conceptual diagram illustrating the temperature measurement method according to the present embodiment.

Hereinafter, the temperature measurement method according to the present embodiment will be described. The temperature measurement method according to the present embodiment is a method for measuring the temperature of the laminate battery cell 110, and is performed by the temperature measurement device 200. FIGS. 5A and 5B are conceptual diagrams illustrating the temperature measurement method according to the present embodiment. FIG. 5A shows a case where the battery cell 110 is viewed as an object, and FIG. 5B shows a case where the battery assembly 100 is viewed as an object. FIG. 5A shows a case where the temperature measurement device 200 is viewed from the rear, and FIG. 5B shows a case where the temperature measurement device 200 is viewed from the front.

In the temperature measurement method according to the present embodiment, as shown in FIG. 5A, the temperature measuring portion 211 is brought into contact with the sealing portion 111*c* near the tab terminal 112. At this time, the temperature measurement device 200 is attached with the sealing portion 111*c* being clamped by the clamping member 220 and the temperature measuring portion 211. Note that attachment of the temperature measurement device 200 can be simply performed by holding the handle portion 241 and applying a force so as to push against the battery cell 110.

This makes it possible to directly measure the temperature of the sealing portion 111*c* near the tab terminal 112 having the highest temperature.

Heat generation of the battery cell 110 is caused by a chemical reaction that occurs in the electrodes due to charging and discharging. Therefore, there is a certain correlation between the temperature of the sealing portion 111c measured by the temperature measurement device 200 and the temperature of the electrode portion 111a.

Thus, in the temperature measurement method according to the present embodiment, the temperature of the electrode portion 111a is estimated from the temperature of the sealing portion 111c measured by the temperature measurement device 200, based on the correlation between the temperature of the sealing portion 111c and the temperature of the electrode portion 111a. Here, the correlation between the temperature of the sealing portion 111c and the temperature of the electrode portion 111a may be given by experimentally confirming in advance. Alternatively, the correlation may be given according to a predetermined model (that may be a data-based model) from the configurations of the battery assembly 100 and the battery cell 110.

Accordingly, the temperature of the electrode portion 111a can be indirectly measured without the need to directly attach the temperature measurement device 200 to the electrode portion 111a.

Further, the temperature measurement device 200 is attached by the clamping force generated by the leaf spring portion 221. Therefore, with the elastic deformation of the leaf spring portion 221, it is possible to maintain the clamping force even when the laminate film 111 creeps with time.

4. Battery System

The temperature measurement device 200 may be attached to the battery assembly 100 only when necessary or may be integrated with the battery assembly 100 to constitute a single package. When the temperature measurement device 200 is integrated with the battery assembly 100, a battery system having a function of measuring the temperature of the laminate battery cell 110 for the battery assembly 100 is provided. With the battery system of the present embodiment, the temperature of the laminate battery cell 110 can be constantly monitored without the temperature measurement device 200 directly attached to the electrode portion 111a of the battery cell 110.

5. Effects

As described above, the temperature measurement device 200 and the temperature measurement method according to the present embodiment can measure the temperature of the laminate battery cell 110 without the need to directly attach the device to the electrode portion 111a. In particular, the temperature of the electrode portion 111a can be measured indirectly. In addition, the temperature of the sealing portion 111c near the tab terminal 112 having the highest temperature can be directly measured. Accordingly, by performing control of charging and discharging based on the measured temperature, it is possible to improve the reliability regarding the durability of the battery cell 110 as well as improve the efficiency.

Furthermore, in the battery assembly 100 in which the battery cells 110 are densely arranged, it is possible to measure the temperature while suppressing the constraining surface pressure from becoming uneven. This eliminates the need to increase the size of the module or package composed of the battery assembly 100 for the measurement of the temperature. This contributes to miniaturization of modules and packages.

Further, the temperature sensor 230 measures the temperature in the heat transfer portion 212 with the transfer of heat of the temperature measuring portion 211. Thus, it is possible to increase the flexibility in arrangement of the temperature sensor 230.

Also, the temperature measurement device 200 can be attached to the sealing portion 111c so as not to interfere with the gas pocket portion 111b. Thereby, even when the gas pocket portion 111b expands due to age deterioration, the laminate film 111 is not damaged and gas does not leak.

Further, the temperature measurement device 200 is attached with the clamping force generated by the leaf spring portion 221. Therefore, even when the laminate film 111 creeps with time, it is possible to maintain the clamping force.

The resin member 240 of the temperature measurement device 200 includes the handle portion 241. Therefore, it is possible to easily perform attachment of the temperature measurement device 200.

The temperature measurement device 200 and the temperature measurement method according to the present embodiment have been described as being applied to the battery assembly 100 shown in FIG. 1 as an example. However, the temperature measurement device 200 and the temperature measurement method may be suitably adopted for the battery assembly 100 having other configurations or a modularized or packaged battery. For example, the temperature measurement device 200 and the temperature measurement method may be suitably adopted for the battery assembly 100 having a different connection of the battery cells 110, a different arrangement of the battery cells 110, or a different laminate structure of the battery cells 110, or a battery in which the battery assemblies 100 are modularized or packaged.

6. Modification

The temperature measurement device 200 and the temperature measurement method according to the present embodiment may adopt a modified mode as described below. In the following, description overlapping with the above description will be omitted as appropriate.

6-1. First Modification

Figure 6A:
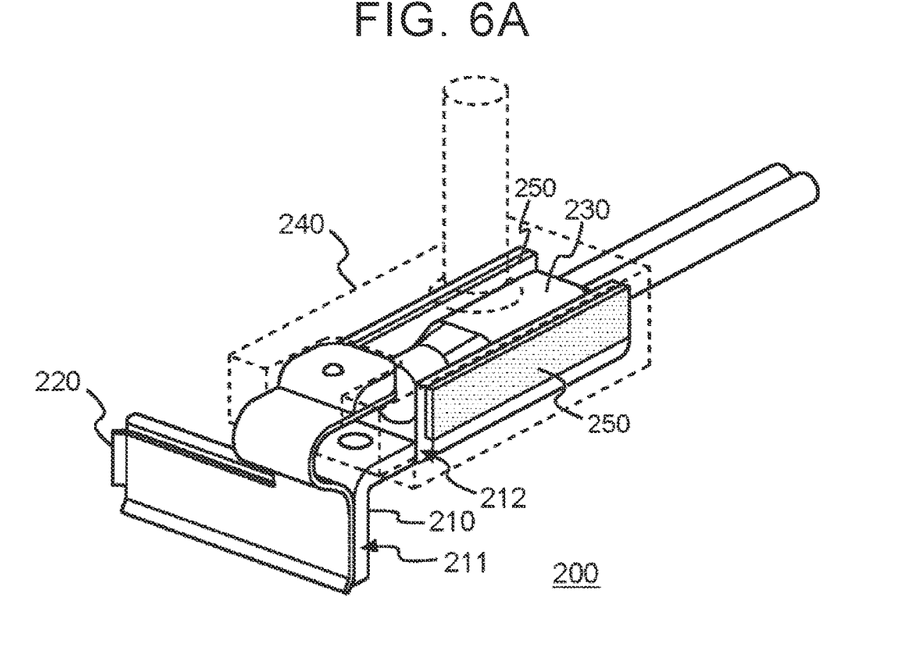
FIG. 6A is a perspective view showing a temperature measurement device according to a first modification of the present embodiment.
Figure 6B:
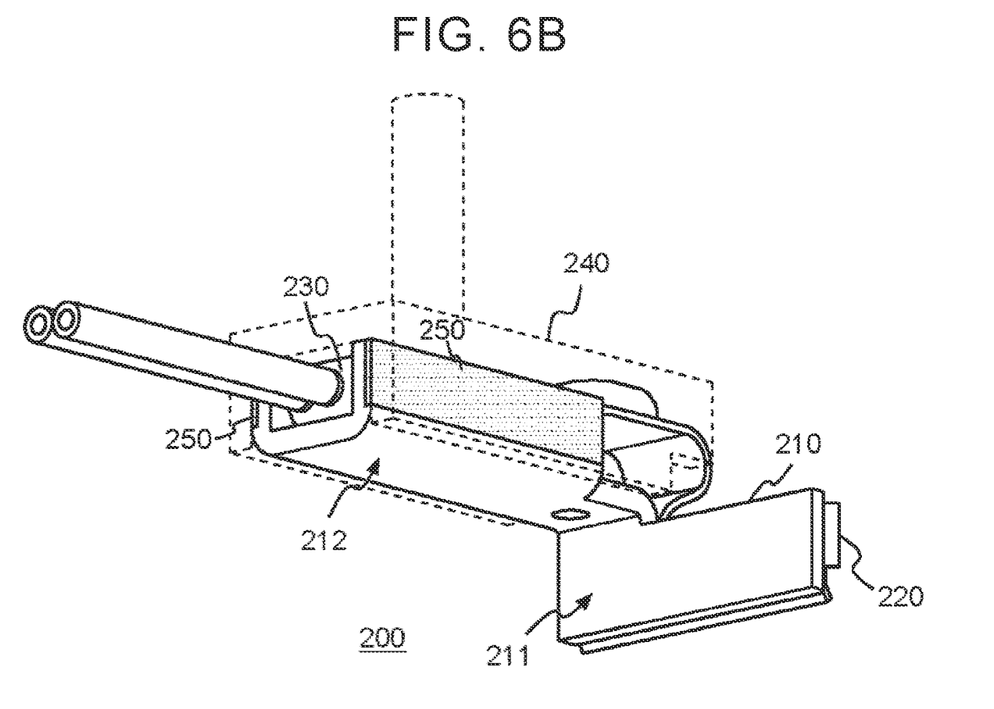
FIG. 6B is a perspective view showing the temperature measurement device according to the first modification of the present embodiment.

The temperature measurement device 200 may further include a heat insulating member disposed between the heat transfer portion 212 and the resin member 240. FIGS. 6A and 6B are perspective views showing the temperature measurement device 200 according to a first modification of the present embodiment. FIG. 6A shows a case where the temperature measurement device 200 is viewed from the front, and FIG. 6B shows a case where the temperature measurement device 200 is viewed from the rear.

As shown in FIGS. 6A and 6B, the temperature measurement device 200 according to the first modification includes the heat insulating member 250 disposed between the heat transfer portion 212 and the resin member 240. Thus, it is possible to suppress the heat transfer from the heat transfer member 210 to the resin member 240 while reducing measurement errors of the temperature by the temperature sensor 230.

6-2. Second Modification

Insulation coating may be applied to the temperature measuring portion 211 and the clamping member 220 of the temperature measurement device 200. The insulation coating is, for example, alumite, cationic coating, an insulation film, or the like. Thus, it is possible to increase the insulation of the temperature measurement device 200. This is effective when the temperature measurement device 200 has an insufficient insulation distance from the surroundings.

Figure 7:
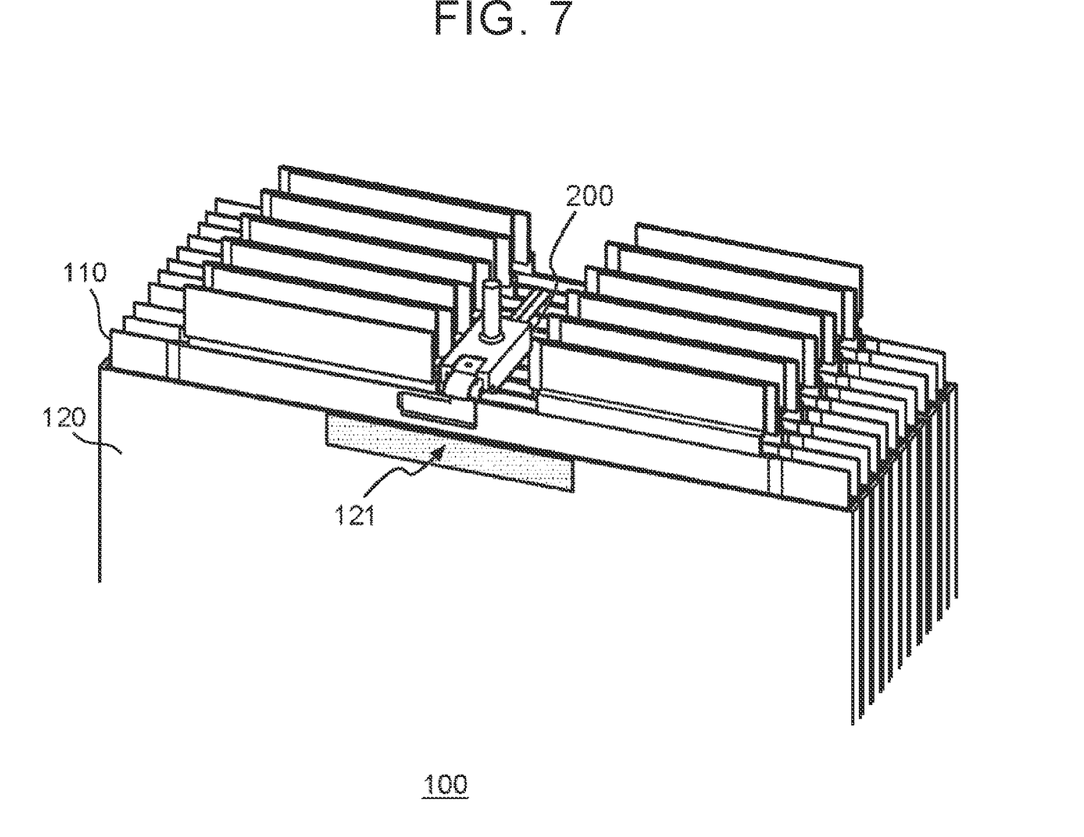
FIG. 7 is a conceptual diagram showing an example of a battery system according to a second modification of the present embodiment.

Alternatively, as a battery system, insulation coating may be applied to a portion near the temperature measuring portion 211. For example, as shown in FIG. 7, the insulation coating may be applied to a portion 121 of the heat radiating plate 120 near the temperature measuring portion 211.

What is claimed is:

1. A temperature measurement device comprising:
   a heat transfer member including a temperature measuring portion having a flat shape and extending laterally and a heat transfer portion that extends continuously from the temperature measuring portion and transfers heat of the temperature measuring portion;
   a clamping member that generates a clamping force with the temperature measuring portion;
   a temperature sensor that is fixed while being in contact with the heat transfer portion; and
   a resin member that covers and holds the heat transfer portion and the temperature sensor.

2. The temperature measurement device according to claim 1, wherein the clamping member uses a portion serving as a leaf spring to generate the clamping force with the temperature measuring portion.

3. The temperature measurement device according to claim 1, wherein the resin member includes a handle portion.

4. The temperature measurement device according to claim 1, further comprising a heat insulating member disposed between the heat transfer portion and the resin member.

5. The temperature measurement device according to claim 1, wherein an insulation coating is applied to the temperature measuring portion and the clamping member.

6. A battery system comprising:
   a battery assembly composed of a laminate battery cell; and
   a temperature measurement device for measuring a temperature of the battery cell,
   wherein the temperature measurement device includes
      a heat transfer member including a temperature measuring portion having a flat shape and extending laterally and a heat transfer portion that extends continuously from the temperature measuring portion and transfers heat of the temperature measuring portion,
      a clamping member that generates a clamping force with the temperature measuring portion,
      a temperature sensor that is fixed while being in contact with the heat transfer portion, and
      a resin member that covers and holds the heat transfer portion and the temperature sensor, and
   wherein the temperature measuring portion is in contact with a sealing portion of a laminate film that is located near a tab terminal of the battery cell, and the temperature measuring portion is attached with the sealing portion being clamped by the clamping member and the temperature measuring portion.

7. The battery system according to claim 6, wherein the clamping member uses a portion serving as a leaf spring to generate the clamping force with the temperature measuring portion.

8. The temperature measurement device according to claim 1, wherein an insulation coating is applied to the temperature measuring portion and the clamping member, or a portion near the temperature measuring portion.

* * * * *